Dec. 6, 1966 A. G. LECIEJEWSKI 3,290,100

BEARING DEVICES

Original Filed Feb. 2, 1962 2 Sheets-Sheet 1

INVENTOR
ANTHONY G. LECIEJEWSKI

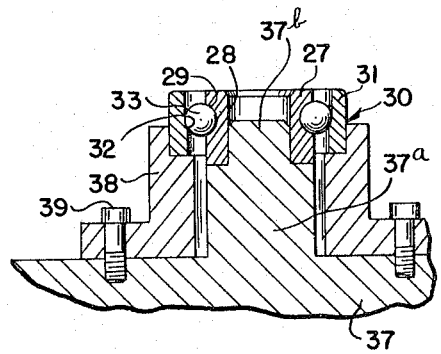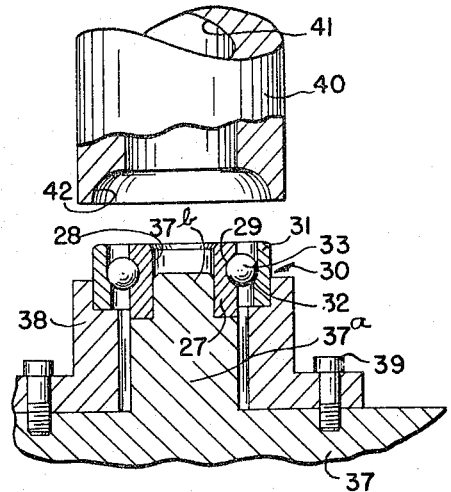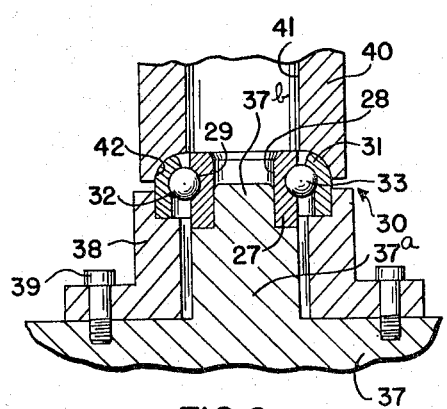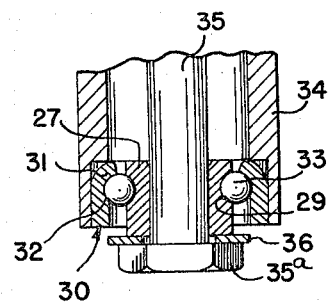

United States Patent Office 3,290,100
Patented Dec. 6, 1966

3,290,100
BEARING DEVICES
Anthony G. Leciejewski, Cleveland, Ohio, assignor to Freeway Washer & Stamping Company, a corporation of Ohio
Original application Feb. 2, 1962, Ser. No. 170,708. Divided and this application Apr. 24, 1964, Ser. No. 374,218
9 Claims. (Cl. 308—6)

This application is a division of my application Serial No. 170,708 filed February 2, 1962, now Patent No. 3,139,666 granted July 7, 1964, which in turn was a continuation-in-part of my application Serial No. 100,694 filed in the United States Patent Office on April 4, 1961, and now abandoned, by Anthony G. Leciejewski.

My invention relates to ball bearing devices.

An object of my invention is to provide an economically assembled bearing device having a unique and advantageous structure.

Another object of my invention is the provision for providing a bearing assembly having non-split inner and outer race members and having a plurality of bearing balls locked in position between the members for bearing engagement therebetween.

Another object is the provision of a novel ball bearing device having a unique arrangement of structural parts retaining the balls of the bearing in position within a minimum of parts and fewer operations to assemble.

Other objects and a fuller understanding of this invention may be had by referring to the following description and claims, taken in conjunction with the accompanying drawings, in which:

FIGURE 7 is a cross-sectional view of a modified form of our bearing device made by a modification of the first described method and shows an early stage of fabrication and assembly;

FIGURE 8 is a view like that of FIGURE 7 and showing the parts after a modified punch has been positioned over the parts in axail alignment therewith;

FIGURE 9 is a view like that of FIGURE 7 after the punch has been moved down to its ultimate position to complete its forming operation; and FIGURE 10 is a view illustrating a completed bearing device in the described modified form mounted to a mounting element and inserted in a shell or roller.

Figure 1:
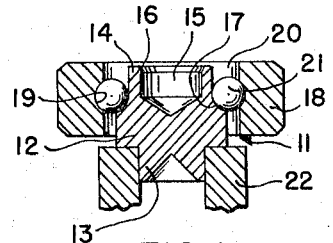
FIGURE 1 is a cross-sectional view of a preferred form of my improved bearing device in an early stage of its fabrication and assembly.

My improved bearing device in its preferred form has an outer race member 18 of metal or of other suitable material. It is a non-split race member, that is, it is integral as one piece completely around the circumference of the race member and thus provides a continuous or non-broken raceway surface. A cylindrical bore extends through the outer race member 18 from end to end, and in the wall of this bore intermediate the ends there is an annular groove 19 adapted to provide the outer surface of a raceway.

An inner race member 11 is provided with a central body portion 12 which is round and of somewhat smaller diameter than the bore in the outer race member 18, as seen in the drawing. Extending from one end of the central body portion 12 (from the lower end as seen in FIGURES 1 to 4) is a center boss or extension 13 which has a conical recess extending therein and axially disposed.

The inner race member 11 has formed thereon an annular shoulder 17 which is spaced radially inward from the groove 19 in the outer race member 18. Engaging this shoulder 17 and also engaging the inner wall of the groove 19 are a plurality of bearing balls 21 arranged in a circle as shown between the inner and outer race members.

The balls 21 are retained against axial displacement from the shoulder 17 and groove 19 and hence in the raceway between the inner and outer race members by an annular lip or wall portion 14 extending axially and radially outward in a curve from the central body portion 12. The lip or wall portion 14 surrounds a recess 15 centrally located in the inner race member at the end of boss 13. This lip or wall portion has an outer surface which complements the portion of the cross-sectional shape of the balls 21 contacted. In other words, the radius of this outer surface of the lip or wall surface 14 is substantially the same as the radius of the individual balls. The lip or wall portion 14 is curved radially outward sufficiently to provide a confining raceway for the balls 21 without appreciable looseness except in planetary movement but without binding or tightly engaging the balls and hence not preventing their free rotation in their raceway path. The annular lip or wall portion 14 and shoulder 17, in effect provide an annular groove in the inner race member 11 which with opposed groove 19 provides a raceway for balls 21. It will be noted in FIGURE 4 that the centers of the balls are disposed substantially equidistantly between the maximum outer circumference of the inner race member and the minimum inner circumference of the outer race member at locations adjacent and on both axially spaced sides of said opposed grooves.

Figure 3:
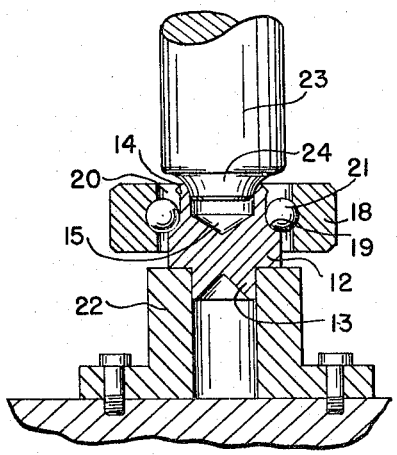
FIGURE 3 is a view like that of FIGURE 1 after the punch has been partially lowered to its ultimate position and the bearing device has been partially formed by the punch.
Figure 4:
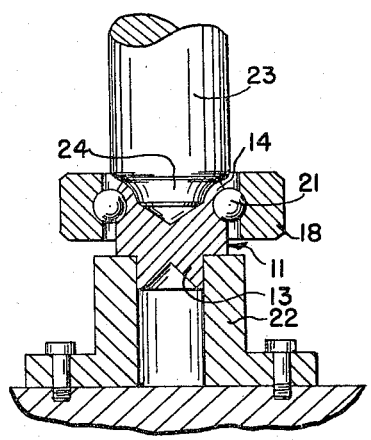
FIGURE 4 is a view like that of FIGURE 1 after the punch has been moved down to its ultimate position to complete its forming operation.
Figure 5:
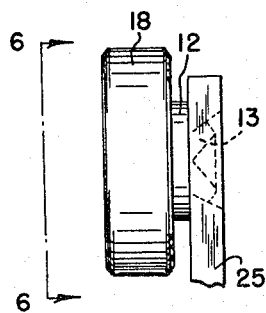
FIGURE 5 is a view of the completed bearing device secured to a mounting element.

As seen in FIGURE 5, the boss 13 is secured to a mounting element 25, for example a metal plate used in the roller support construction for drawers such as file cabinet drawers. The boss 13 is positioned in an opening in the plate 25 and the metal of boss 13 surrounding the recess therein is peened over to tightly engage the chamfered walls of the opening in plate 25, as seen in FIGURE 3.

To fabricate and assemble my improved bearing device, the balls are, by a suitable fixture, first positioned in the groove 19 of an outer race member 18. Then an inner race member 11, having the initial form illustrated in FIGURE 1, is inserted into the bore of the outer race member 1P from the lower end of the race member 11. In this position, the balls 21 are in the groove 19 and engage the shoulder 17.

In this initial form of the inner race member 11, the lip or wall portion 14 extends axially upward as shown to form a cylindrical wall around the recess 15. The inner annular edge 16 of the end of the lip or wall portion 14 is chamfered as shown in FIGURE 1. The annular space between the inner and outer races is designated by the reference charatcer 20.

The assembly is then mounted on a support member 22 which has a cylindrical hollow upper end formed to completely receive boss 13 and to engage the central portion 12. The support 22, engaging the central portion 13, directly supports the inner race 11, and through the balls 21 indirectly supports the outer race 18.

After the parts are in the position shown in FIGURE 1, a punch 25 carried by a press or other power machine is positioned over the assembly in axial alignment therewith. The punch 23 has a nose portion 24 which has side walls extending therearound which are disposed in a concave radial curve. The radius of this curve is substantially the same as the radius of each ball 21.

Figure 2:
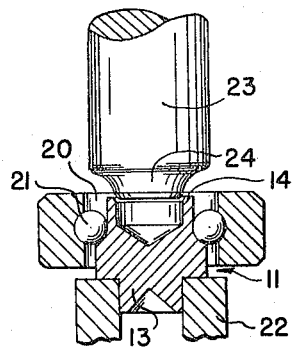
FIGURE 2 is a view like that of FIGURE 1 and showing the parts after a punch has been positioned over the parts in axial alignment therewith.

Next, the punch 23 is brought downwardly by force from the position of FIGURE 2 to the position of FIGURE 3. By reason of the chamfered edge 16, the nose portion 24 readily enters the recess 15 and forces the lip or wall portion 14 radially outwardly in a curve. Downward forced movement of the punch 23 is continued until nose portion 24 has forceably moved or spread the metal of lip or wall portion 14 outwardly to the position shown in FIGURE 1. In this formed condition of lip or wall portion 14, the open space 20 between the inner and outer race members is sufficiently closed to prevent the balls from axial displacement therein and to properly confine the balls.

By carefully controlling the extent of the downward movement of the punch 23 relative to the position of the support 22, the lip or wall portion 14 is brought over and radially expanded just sufficiently to confine the balls 21 in a smooth groove formed by shoulder 17 and the peened-over lip or wall 14 but not enough to force any metal between the balls 21 and not to the point of binding or gripping the balls.

It is important that there be no breaks or cracks in the lip or wall portion 14 after it is peened or spread outwardly as described, and therefore the metal of the inner race member 11 should be of a sufficient ductile or malleable character as to permit the required forming as described by the punch without splitting or cracking. There are a number of metals, including alloy steels, readily available and known to those skilled in the art which are appropriate. After the bearing device is formed, it may be case hardened or treated as desired.

Figure 6:
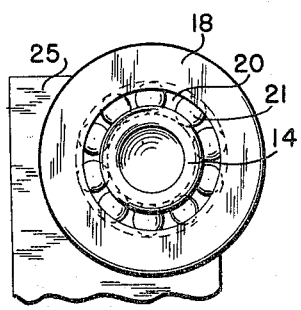
FIGURE 6 is a plan view of the assembled bearing device looking in the direction of the arrows 6—6 of FIGURE 5.

After the inner and outer race members with balls are assembled, as described in connection with FIGURES 1 to 4, then the assembly may be mounted to a plate 25 or other suitable mounting element, as described in connection with FIGURES 5 and 6.

A modified form of bearing device made by a modified method is illustrated in FIGURES 7 to 10, inclusive. In this modified form, the inner race member 27 has an annular groove 29 formed in its outer cylindrically-shaped wall. The outer race member 30 is dimensioned to concentrically receive the inner race member 27 therein as illustrated. The outer race member 30 has an annular shoulder 32 formed therein at a distance from the upper end of the bearing device with the parts disposed as illustrated in FIGURES 7 and 8. In its initial form, the outer race member 30, from the shoulder 32 and extending upwardly therefrom, has an annular lip portion 31 which is of less radial thickness than is the race member 30 below the shoulder 32. In other words, the annular space between the inner and outer race members is greater above the shoulder 32 than it is below the shoulder 32.

To assemble and form the modified form of bearing device, the outer race member 30 is positioned upon an annular support 38 which, in turn, is supported upon a base plate 37 in such manner that the shoulder 32 is facing upwardly and the outer race member 30 is firmly supported with its axis in a vertical direction upon the support 38. Thereafter balls 33 are assembled on the inner race member 27 so as to be disposed in the annular groove 29 prior to the introduction of the inner race member 27 within the outer race member 30. The assembly of inner race member 27 and plurality of balls 33 is then lowered downwardly along the axis of the outer race member 30 to the position illustrated in FIGURE 7 and where the plurality of balls 33 rest upon and engage the annular shoulder 32. By reason of the dimensions of the parts, the balls 33 may move axially downwardly within the outer race member 30 to the location of the shoulder 32 but may not go below the level of the shoulder 32.

When in this lower position illustrated in FIGURE 7, the inner race member 27 is supported on the central portion 37a projecting upwardly from the base plate 37. A boss or projection 37b extending upwardly from the central portion 37a is disposed within a bore 28 of the inner race member 27 so as to centrally locate the inner race member 27 concentrically within the outer race member 30. The described supports firmly hold the parts in the fixed elevation illustrated in FIGURE 7. Bolts 39 firmly hold the support 38 in fixed position on the base plate 37.

The outer race members and particularly the outer race member 30, are made of a suitable bendable metal to adapt itself to the forming operation herein described.

After the parts are assembled and positioned as shown in FIGURE 7, then a punch 40 is positioned over the assembly of race members and balls as illustrated in FIGURE 8. This punch 40 has a bore 41 and extending from the lower end of the punch 40 to the bore 41 there is a cupped or dished recess 42 having inner curved walls of annular form as illustrated.

By a hydraulic press or other mechanical force, the punch 40 is forceably brought downwardly toward the base plate 37 so that the upper outer corner of the lip portion 31 of the outer race member 30 is engaged by the curved sloping inner wall of the recess 42. Further downward movement of the punch 40 tends to force the lip portion 31 radially inward by a camming or squeezing action and the outer race member 30 is thereby bent to the form illustrated in FIGURE 9. As seen, the lip portion 42 has been bent so as to overlie the plurality of balls and to form in cooperation with the shoulder 32 an annular groove in the inner wall of the outer race member 30. By reason of the extract and precise location of the supporting base plate 37 and the exact and precise movement of the punch 40, the lip portion 31 is formed radially inward only a sufficient amount to form the annular groove required for the balls 33 but without pressing upon the balls 33 so as to lock them against free rotation. The exactness of the dimensions and movements assure that the metal of the lip portion 31 does not flow downwardly between the individual balls 33 but rather forms a smooth, even annular wall in the groove formed by the shoulder 32 and the inwardly turned or formed lip portion 31, resulting from the pressing by the punch 40. The opposed groove 29 in the inner race member 27 and the groove formed by the shoulder 32 and by the compressed or formed-over lip portion 31, together form an annular raceway for the plurality of balls 33 arranged in a circle between the inner and outer race members.

After the bending has been completed, as shown in FIGURE 9, then the punch 40 is raised and the assembly of inner and outer race members with the balls therebetween is removed from the support given by the supporting portions 38 and 37a. The assembly is then ready for use in a roller or other structure.

In FIGURE 10, there is illustrated a mounting of the modified form of our bearing device in a cylindrical roller 34 which may be of the usual type of which a plurality are mounted to a long frame to make a roller type conveyor, such as those used for rolling containers by gravity down a grade between spaced locations. The end of the cylindrical roller 34 is recessed to receive the bearing device assembly, the recess being dimensioned to snugly receive in a press fit the outer race member 30 so that the assembly is substantially contained within the recess formed within the roller 34. An inner shoulder at the bottom of the recess provides an abutment for the inner end of the race member 30 so as to prevent the assembly from going inwardly beyond the position illustrated in FIGURE 10. A shaft such as a bolt 35 is positioned axially within the bore in the inner race member 27. The bolt 35 is adapted to be secured to a supporting member, not shown, in such manner that the cylindrical roller 34 may freely revolve around the shaft or bolt 35. A head 35a of the bolt 35 engages a washer 36 which, in turn, abuts the outer end of the inner race member 27 so that the bolt 35 is secured to the inner race member 27. The typical assembly of parts illustrated in FIGURE 10 shows an advantageous use of the bearing device made as described.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A bearing assembly comprising in combination an outer race member having a cylindrical bore extending therethrough, the wall of said bore having a first annular groove formed therein intermediate the ends of said bore, an integral metal inner race member centrally disposed in said bore and concentric with the said outer race member, said inner race member having a recess provided at a first axial end and an extension portion extending from the opposite end for engagement with a mounting element, said inner race member having an annular shoulder extending therearound and facing toward said first axial end, the inner race member adjacent said first axial end having an outer wall portion surrounding said recess and inclined radially outwardly in a gradual curve to substantially the outer radial extent of said shoulder so as to define with said annular shoulder a second annular groove radially inward of the maximum diameter of said inner race member, said second annular groove having substantially the same depth as the first annular groove and facing and disposed radially inward of said first annular groove to provide an annular raceway, said recess having a closed bottom wall and side walls extending axially and radially outwardly in a curve complementing the curve of said outer wall portion, and a plurality of balls arranged in a circle positioned in the raceway defined by said grooves, said outer wall portion being of substantially uniform thickness from approximately a transverse plane passing through the centers of said balls to said first axial end.

2. A bearing member comprising in combination an outer race member, an integral metal inner race member concentric therewith, and a plurality of balls arranged in a circle therebetween and concentric with the inner and outer race members, said outer race member having an annular groove intermediate its ends and facing the inner race member, the inner race member having an annular groove facing the annular groove of said outer race member to define a raceway therebetween accommodating said balls, the walls of the groove in said inner race member curving about said balls longitudinally of the inner race member substantially equal distances on both sides of a transverse plane through the centers of said balls, said inner race member having a centrally disposed recess with a closed bottom wall extending axially thereof from a first end of the inner race member, said recess being surrounded by an outer annular wall portion extending axially and radially outwardly in a curve, said outer annular wall portion being of substantially uniform thickness from approximately a transverse plane passing through the centers of said balls to said first end of the inner race member, the radially outwardly facing surface of said annular wall portion being at least a portion of the surface of the groove of said inner race member and extending toward the outer race member to confine said balls in said raceway, said recess having a closed bottom wall and side walls extending axially and radially outwardly in a curve complementing the curve of said outer annular wall.

3. A bearing member having an integral metal inner race member, an outer race member, and a plurality of balls in a circle between said race members disposed in concentric relationship, the said outer race member having a central bore extending therethrough and a first annular groove in the wall of said bore intermediate the ends of the inner race member for accommodating said balls, the inner race member having a solid central portion, an engaging portion extending axially from said central portion at a first axial end for engagement with a mounting element, and a recess extending axially of the inner race member from the opposite axial end and into said central portion, said inner race member having an annular shoulder disposed radially inwardly of the outer race member opposite the said first annular groove therein, the said inner race member having an outer annular wall extending continuously around said recess and inclined in a slope radially outwardly and axially substantially to a reference cylinder coinciding with the outer radial extent of said shoulder to form with said shoulder a second annular groove extending radially inward of the inner race member and disposed opposite of the first annular groove, said outer annular wall being of substantially uniform thickness from approximately a transverse plane passing through the centers of said balls to said opposite axial end of the inner race member, said opposed grooves providing a raceway confining said balls between said race members, said recess having a bottom wall extending thereacross and extending from the said central portion thereof axially and radially outwardly toward said opposite axial end to laterally brace said outer annular wall.

4. A bearing member comprising the combination of an integral metal inner race member, an outer race member concentric therewith, and a plurality of balls positioned between said race members in a circle concentric with said race members, the outer race member having a first annular groove directed radially inwardly for accommodating said balls in said circle, the inner race member having a solid body portion, a stem portion extending axially of the body portion toward a first end of the inner race member, said body portion having an annular shoulder extending therearound intermediate the ends thereof and disposed radially inwardly of, and opposite, the said first annular groove, the said inner race member having a cupped end at the opposite end thereof providing a centrally disposed recess extending toward said first end to substantially a transverse plane passing through the centers of said balls, the outer wall of said inner race member around said recess extending in a curve radially outwardly to form with said annular shoulder a second annular groove being of substantially equal depth to accommodate in each groove less than half the volume of said balls, and the walls of said recess being of substantially uniform thickness from approximately said transverse plane to said opposite end of the inner race member, said grooves facing each other to form a raceway confining said balls, the walls of said recess extending axially and radially outwardly from the bottom of the recess in a curve complementing the curve of said outer wall.

5. A bearing assembly comprising in combination, an inner race member having a cylindrical outer wall, said outer wall of said member having a first annular groove formed therein intermediate the ends of said outer wall, an integral outer race member concentrically disposed around said inner race member, said outer race member having a bore accommodating said inner race member, said outer race member having an internal annular shoulder extending around the bore thereof and facing toward a first axial end thereof, the outer race member adjacent said first axial end having a wall portion of substantially uniform radial thickness surrounding the bore thereof and inclined radially inwardly in a gradual curve to define with said annular shoulder a second annular groove and disposed radially outward of said first annular groove to provide an annular raceway, the minimum diameter of said inclined wall portion at a first side of the formed second annular groove being less than the minimum diameter of said annular shoulder at an opposite side of said second annular groove to decrease the space between the race members on said first side, and a plurality of balls arranged in a circle positioned in the raceway defined by said grooves, the outer circumferential wall surface of said wall portion defining the outer circumferential wall surface of said integral outer race member and extending to said first axial end in conformity with said gradual curve.

6. A bearing assembly comprising in combination, an inner race member having an external annular groove extending around the outer wall thereof, an integral outer race member having an internal annular shoulder formed around the inner wall thereof and facing a first axial end thereof, said outer race member having a wall portion of uniform radial thickness extending in a gradual radial curve from said annular shoulder toward said first axial end to define with said shoulder an internal annular groove disposed oppositely of said external annular groove of the inner race member to form therewith an annular raceway, the minimum diameter of said inclined wall portion at a first side of the formed second annular groove being less than the minimum diameter of said annular shoulder at an opposite side of said second annular groove to decrease the space between the race members on said first side, and a plurality of balls arranged in a circle positioned in said annular raceway, the outer circumferential wall surface of said wall portion defining the outer circumferential wall surface of said integral outer race member and extending to said first axial end in conformity with said gradual radial curve.

7. A bearing assembly comprising an inner race member having an external annular groove formed in the outer wall thereof, an integral outer race member concentric with said inner race member and having an internal annular groove formed in the inner wall thereof opposite said external annular groove to form a raceway therewith, and a plurality of balls arranged in a circle and disposed in said raceway, the said internal annular groove being formed by an internal annular shoulder facing a first end of the outer race member and by a circular wall portion of uniform radial thickness extending from said shoulder in a curve toward said first end, the outer circumferential wall surface of said wall portion defining the outer circumferential wall surface of said integral outer race member and extending to said first end in conformity with said curve, the inner and outer wall surfaces of said circular wall portion being concentric and disposed in arcs generated on centers disposed on the circle of said balls, the inner wall surface of said wall portion extending radially inward beyond the axially directed projection of said annular shoulder to provide additional bearing surface for axial thrust.

8. A bearing assembly comprising an inner race member having an external annular groove formed in the outer wall thereof, an integral outer race member concentric with said inner race member and having an internal annular groove formed in the inner wall thereof facing said external annular groove to form a raceway therebetween, a plurality of balls arranged in a circle and disposed in said raceway, the internal annular groove in said outer race member being formed by an internal annular shoulder in said outer race member facing an end thereof and by a wall portion of substantially uniform thickness disposed in a radial curve from said shoulder to said end, the inner and outer surfaces of said wall portion extending concentrically from a plane through the centers of the balls to the end of the wall portion at a side of the assembly and the inner surface extending radially inward to a circle having a substantially smaller diameter than a circle coinciding with said annular shoulder, the inner and outer wall surfaces of said wall portion being concentric and disposed in arcs generated on centers disposed on the circle of said balls, the said outer wall surface of the wall portion defining the outer wall surface of said integral outer race member at said end, an annular shell member embracing said outer race member and having a recess adjacent an end thereof, said recess having an inner wall embracing the outer wall surface of said wall portion of said outer race member, and a shaft extending through and secured to said inner race member.

9. In a bearing assembly comprising concentric inner and outer race members and a plurality of balls arranged in a circle and disposed in a raceway formed of oppositely disposed grooves in the respective race members, the improvement of one of said race members being of one piece having an annular wall portion of substantially uniform thickness adjacent an end thereof and integral therewith, the said wall portion having inner and outer wall surfaces curved in concentric arcs generated on centers disposed on the circle of said balls, the centers of said balls being disposed substantially equidistantly between the maximum outer circumference of the inner race member and the minimum inner circumference of the outer race member at locations adjacent and on both axially spaced sides of said opposed grooves, the inner of said wall surfaces forming a portion of the groove in said one of the race members, said outer wall surface of said wall portion extending from a transverse plane through the centers of said balls to said end and defining the outer circumferential wall surface of said one race member at said end.

References Cited by the Examiner

UNITED STATES PATENTS

| | | | |
|---|---|---|---|
| 1,048,758 | 12/1912 | Sultemeyer | 29—148.4 |
| 1,910,208 | 5/1933 | Gronberg | 308—3.8 |
| 2,149,349 | 3/1939 | Kilian | 308—6 |
| 2,350,228 | 5/1944 | Hanes | 308—6 |
| 2,355,511 | 8/1944 | Cobb | 308—190 X |
| 2,768,725 | 10/1956 | Foulds et al. | 308—190 |
| 2,998,636 | 9/1961 | Spence | 308—195 |
| 3,105,725 | 10/1963 | Biesecker | 308—195 |

FOREIGN PATENTS

| | | |
|---|---|---|
| 502,554 | 4/1951 | Belgium. |
| 15,502 | 7/1907 | Great Britain. |
| 327,050 | 5/1930 | Great Britain. |

DAVID J. WILLIAMOWSKY, *Primary Examiner.*

ROBERT C. RIORDON, *Examiner.*

F. C. HAND, F. SUSKO, *Assistant Examiners.*